July 11, 1950     E. A. SCHONROCK     2,514,726
TAIL GATE LATCH
Filed Feb. 25, 1949                         2 Sheets-Sheet 1
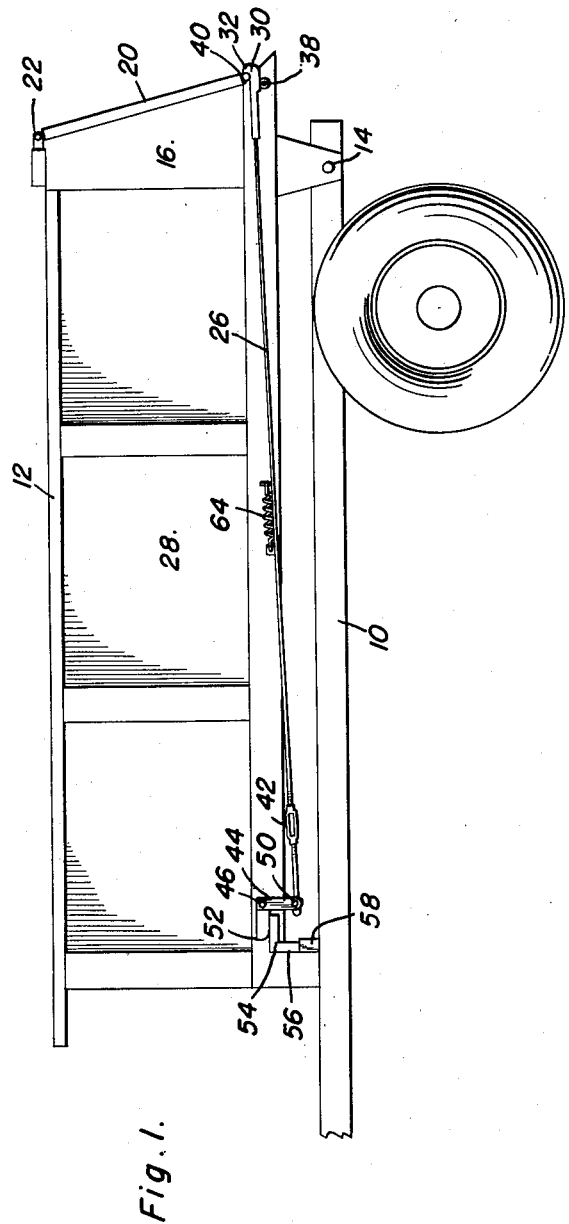
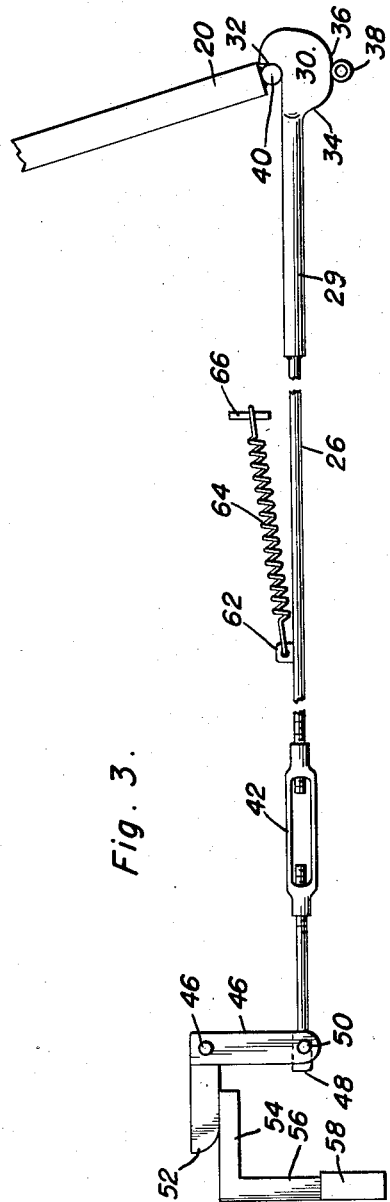
Inventor
Edwin A. Schonrock
By *Clarence A. O'Brien and Harvey B. Jacobson*
Attorneys

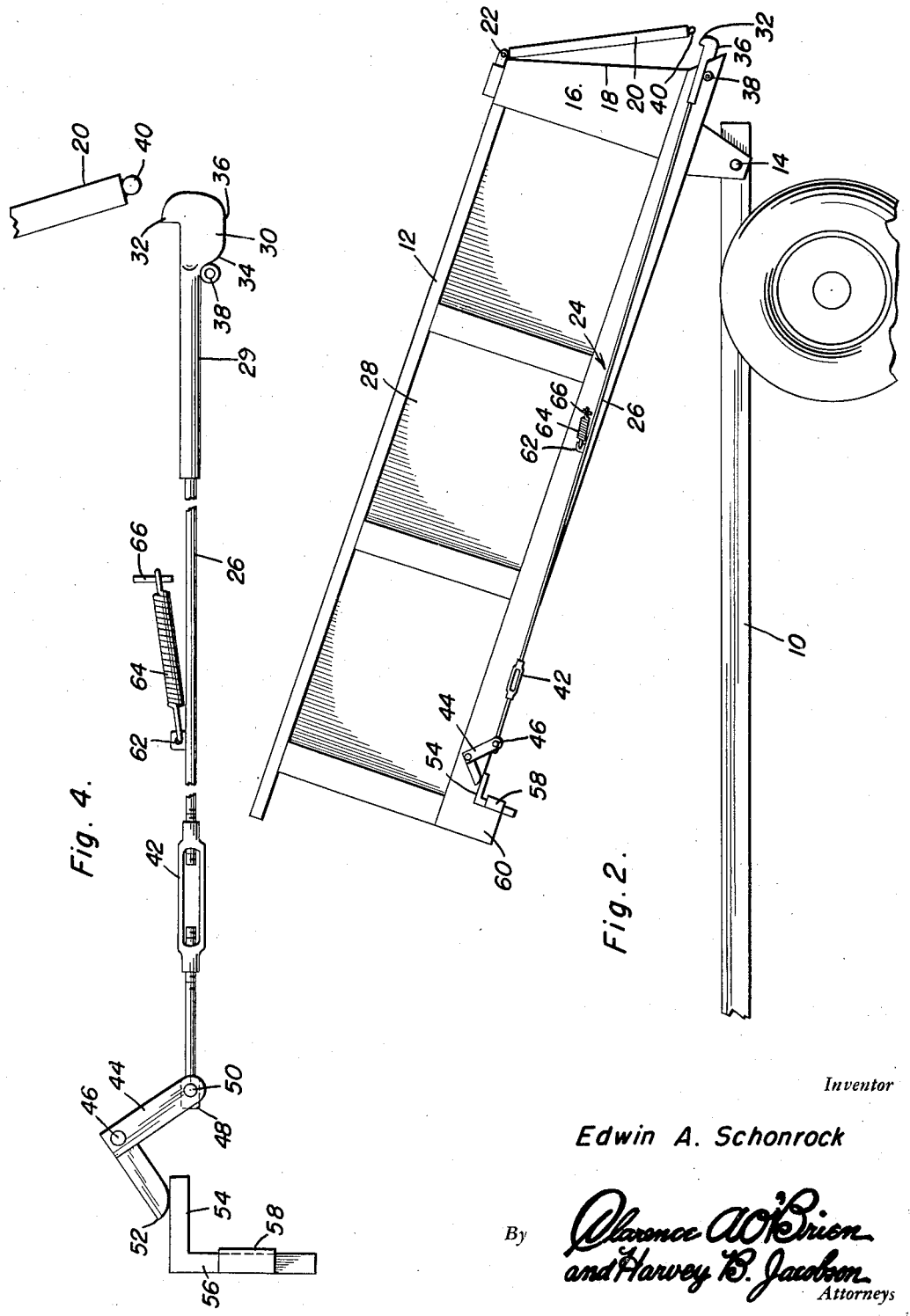

Patented July 11, 1950

2,514,726

UNITED STATES PATENT OFFICE 2,514,726

TAIL GATE LATCH

Edwin A. Schonrock, San Angelo, Tex.

Application February 25, 1949, Serial No. 78,282

5 Claims. (Cl. 298—38)

This invention relates to improvements in a tail gate latch for a dump truck or trailer, and has for its primary object to automatically latch and unlatch the tail gate of any dump truck or trailer, responsive to tilting movements of the dump body.

Another object of this invention is to positively lock and retain in a locked position the tail gate of a dump body, when the dump body is in a horizontally disposed or carrying position on the chassis or frame.

Another object of this invention is to provide a simple, efficient and inexpensive structure, which can be readily attached to a conventional dump body and which will be automatic in operation, requiring no manual exertion on the part of the driver nor any attention from him.

These and ancillary objects and structural features of merit are attained by this invention, a preferred embodiment of which is set forth in the following description and illustrated in the accompanying drawings, wherein:

Figure 1 is a fragmentary elevational view of a conventional dump truck, illustrating the dump body in a seated position on the chassis and illustrating this invention in operative association therewith, the tail gate of the body being shown in a locked position;

Figure 2 is a similar elevational view, illustrating the dump body in a raised or tilted dumping position, with the tail gate unlatched;

Figure 3 is a detailed elevational view of the tail gate latch structure, constructed in accordance with this invention, and depicting the tail gate in a locked position; and Figure 4 is a similar elevational view of the tail gate latching structure, illustrating the same in a released position, with the tail gate unlatched.

It is the conventional procedure in releasing the tail gate of a dump body, to require the truck operator to leave his driving position and to operate a manual latch to unlatch the tail gate from the dump body. Mechanical means have been provided which can be automatically operated by the truck operator which will not require him to leave his driving position. However, such means are usually complicated, require a considerable expenditure of money and time in attaching them to a conventional dump truck or trailer, and are complicated in nature. Further, the operation of such latches still requires the attention and performance of the truck operator.

It is the primary aim of this invention to eliminate the necessity of any manual operation on the part of the truck operator and to automatically unlatch and latch the tail gate, in response to the tilting movements of the dump body. Thus, when the dump body is in a seated position or horizontally disposed position on the truck chassis, the tail gate would be automatically locked and retained securely in the locked position. When the dump body is tilted upwardly, by mechanical or hydraulic means, the tail gate will be automatically unlatched, responsive solely and entirely to the upward tilting or swinging movement of the dump body.

In the accompanying drawings, a conventional wheeled chassis 10 is illustrated with a dump body 12, pivotally mounted thereon, as at 14, and adapted for vertical swinging movement thereon. The dump body is supported in a carrying position, as in Figure 1, by the chassis and is moved upwardly into a dumping position, as seen in Figure 2, by any conventional means.

A tail gate post 16 is disposed at the rear end of the dump body 12 and positioned at the opposing sides thereof. It is to be noted that the tail gate post is formed with a downwardly and outwardly slanting rear edge 18, the angular inclination of the rear edge 18, of the tail gate post away from the vertical plane permitting the tail gate to be supported in an inclined plane. Thus, the tail gate 20 is pivoted adjacent its upper edge, as at 22, to the tail gate post and is supported in a close position in an inclined plane, as seen in Figure 1.

This invention, designated by the reference 24 is adapted for positioning at the opposing sides of the dump body and is responsive automatically to the positions of the dump body, with respect to the chassis, for interpreting the same in latching and unlatching the tail gate. In the latter respect, however, only one of the gate latching devices have been illustrated, since the one disposed on the opposite side of the dump body, not shown, is identical in structure and function.

A longitudinally disposed rod 26 is positioned parallel with the side 28, of the dump body and is formed with a diametrically enlarged end 29. A cam 30 is integrally formed on the outer rear end of the enlarged extremity 29 and is provided with a cam lobe or lateral projection 32. A cam rise is formed as at 34 and a corresponding dwell is formed as at 36. The cam 30 is adapted to ride upon a fixed cam follower 38, which extends laterally from the side of the body, adjacent the tail gate post 16. The tail gate 20 is formed at its lower or free end with a reduced extension 40, which is adapted for engagement against the cam lobe 32, as seen in Figure 3.

For longitudinal adjustment purposes, a turn buckle 42 is incorporated in the rod 26 to provide for any desired length adjustment of the rod.

A bell crank 44 is pivoted as at 46 to the side of the dump body, adjacent the front closed end thereof. The rod 26 terminates in an enlarged head 48, which is pivoted, by means of a pivot pin 50 to one end of the crank. The other end of the crank terminates in a cam surface 52, which is adapted to ride upon the upper lateral portion 54 of a trip lever 56. The trip lever 56 is freely disposed in a vertically positioned sleeve 58, which is secured to the depending conventional projection 60, formed on the front end of the dump body, the latter being adapted to seat on the chassis, as seen in Figure 1.

Intermediate the ends, the rod 26 is provided with an upstanding perforated ear 62 to which is anchored a spring 64, the spring being similarly secured or anchored to a laterally extending perforated ear 66, carried by the dump body.

In operation, with respect to Figures 2 and 3, it is to be noted that the unlatching action of this device occurs, when the dump body has been raised by the conventional elevation mechanism to an angle of inclination below the extreme dumping position. The action takes place automatically and is reactive to the movement of the dump body. Thus, the trip lever 56 is moved, with the body, away from the seated position on the chassis. Therefore, the trip lever is free to gravitate downwardly in the sleeve 58, the downward movement being initially motivated by the spring 64 and also, by the force exerted by the weight of the load against the inner surface of the tail gate, the latter force being transmitted through the tail gate to the rod 26. As the trip lever moves downwardly in its retaining sleeve 58, a cam action occurs, with the cam surface 52 of the crank moving across the horizontal projection arm 54 of the trip lever. The crank rotates about its pivot point 46, and the rotary movement thereof is converted by means of the pivot 50 into a motion of translation which is imparted to the rod 26 and which allows it to move rearwardly along its longitudinal axis. This rearward movement of the rod is imparted to the tail gate latch, which forms an integral part of the rod. Thus, the cam 30 is moved rearwardly on the cam follower 38, the latter moving in the dwell of the cam, and the cam then dropping downwardly, as the cam rise moves on the cam follower. Thus, the cam is moved rearwardly away from the projection 40 of the tail gate, allowing the same to rotate above.

During the movement of the dump body, downwardly relative to a seated position on the chassis, it is to be apparent that the tail gate will pivot relative to the tail gate post, under the influence of the force of gravity. Due to the inclined outer surface of the tail post (or supplied by an offset hinge or pivot), the tail gate will become positioned in its normal closed position, as seen in Figure 1, prior to the time when the longitudinal axis of the dump body approaches a horizontal position, and also, prior to the time that the lower end of the trip lever contacts its bearing surface on the truck chassis or frame.

As the dump body continues its downward movement about its pivot 14, the forward end thereof reaches an angle of inclination above the horizontal plane or its seated position, at which point, the lower surface of the trip lever engages on the chassis. At this point, the tail gate is closed but is in an unlocked state. However, further rotation of the dump body forces the trip lever upwardly in the retaining sleeve 58 and the crank 44 is moved about its pivot 46, due to the engagement of the cam surface 52, as can be seen in Figures 4 and 3. The further rotation, which is imparted to the crank, is transmitted through its pivoted end to the rod 26. Thus, the movement of the crank is translated into longitudinal movement of the pole rod 26 and the same is urged forwardly, overcoming the urgement of the spring 64. The cam 30, moves up at the rise 34, upon the cam follower 38 and is positioned on the cam follower 38, as seen in Figure 3. The projection 40 and the free end of the gate 20 is thus securely held against the cam lobe 32 and the tail gate is retained in a locked position, during the carrying position of the dump body, as seen in Figure 1.

It can thus be seen that a novelty constructed, automatically operated and efficient structure has been provided for latching and unlatching the tail gate of a dump body. However, while only one embodiment of this invention has been illustrated it is to be understood that various other embodiments may be employed, as coming within the scope of the appended claims.

Having described the invention, what is claimed as new is:

1. In combination with a chassis, a tilting body thereon, a downwardly and outwardly inclined tail gate post at the rear end of said body, a tail gate pivoted at its upper end to said tail gate post, longitudinally extending rods disposed at the opposing sides of the body, latching means engageable with the free end of the gate carried by the rods, positioning means for said latching means carried by the sides of the body, bell cranks pivotally secured to the sides of the body and pivoted at one end to the front ends of the rods, vertically movable members carried by the sides of the body and engageable on the chassis when the body is seated on the chassis, said members being engageable with the bell cranks for moving the rods forwardly and retaining the latching means in engagement of the tail gate, resilient means connected between the body and rods for urging the same rearwardly responsive to an upward tilting movement of the body.

2. In combination with a chasssis, a tilting body thereon, a downwardly and outwardly inclined tail gate post at the rear end of said body, a tail gate pivoted adjacent its upper end to said tail gate post, longitudinally extending adjustable rods disposed at the opposing sides of the body, cams formed on the rear ends of said rods, fixed cam followers for said cams carried by the sides of the body adjacent said tail gate post, cam lobes formed on the upper portions of said cams and engageable with the free end of the tail gate, means associated with the front ends of said rods for moving said rods forwardly and bringing the cam lobes into latching engagement of the free end of the tail gate responsive to the seating of the body on the chassis and means reactive to an upward tilting movement of the body for urging said rods rearwardly.

3. The combination of claim 2, wherein said last named means includes springs connected between the body and the rods.

4. The combination of claim 2, wherein said means for moving the rods forwardly includes vertical sleeves formed on the opposing sides of the body, angular members freely disposed in said sleeves and adapted to seat on the chassis, means contacted by the upper portions of the members for translating the vertical movement of the members into longitudinal movement of the rods.

5. The combination of claim 4, wherein said last means includes bell cranks pivoted to the body and pivotally secured at one end to the front ends of the rods, said cranks being formed with free ends engageable on the upper portions of the members.

EDWIN A. SCHONROCK.

REFERENCES CITED

The following references are of record in the file of this patent:

UNITED STATES PATENTS

| Number | Name | Date |
|---|---|---|
| 1,654,032 | Avery | Dec. 27, 1927 |
| 1,739,376 | Sherwood | Dec. 10, 1929 |
| 1,743,094 | Barrett | Jan. 14, 1930 |